US008411337B2

(12) United States Patent
Suzuki

(10) Patent No.: US 8,411,337 B2
(45) Date of Patent: Apr. 2, 2013

(54) IMAGE FORMING APPARATUS AND IMAGE FORMING METHOD

(75) Inventor: Ryousuke Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 347 days.

(21) Appl. No.: 12/941,330

(22) Filed: Nov. 8, 2010

(65) Prior Publication Data

US 2011/0122464 A1 May 26, 2011

(30) Foreign Application Priority Data

Nov. 26, 2009 (JP) ................................. 2009-268853

(51) Int. Cl.
*H04N 1/60* (2006.01)
*G06F 15/00* (2006.01)

(52) U.S. Cl. ........... 358/505; 358/1.9; 358/1.3; 358/524

(58) Field of Classification Search .................. 358/505, 358/1.9, 1.3, 524, 521, 536
See application file for complete search history.

(56) References Cited

U.S. PATENT DOCUMENTS

| 5,566,003 | A | * | 10/1996 | Hara et al. ..................... 358/448 |
| 6,097,501 | A | * | 8/2000 | Hayashi et al. ................ 358/1.9 |
| 7,684,079 | B2 | * | 3/2010 | Takata et al. ................... 358/1.9 |
| 2006/0232620 | A1 | * | 10/2006 | Kitamura et al. .............. 347/15 |

FOREIGN PATENT DOCUMENTS

| JP | 2002-116394 | 4/2002 |
| JP | 2003-241131 | 8/2003 |
| JP | 2004-170755 | 6/2004 |

* cited by examiner

*Primary Examiner* — Houshang Safaipour
(74) *Attorney, Agent, or Firm* — Fitzpatrick, Cella, Harper & Scinto

(57) ABSTRACT

A step and non-uniformity in density in a drawing object due to an offset for an electrical color-shift correction are reduced. An image forming apparatus includes: a unit for determining a changing coordinate in a main scanning direction for correcting a color shift; a unit for detecting a closed region lying across the determined changing coordinate, from a drawing object; and a unit for performing a changing by using the determined changing coordinate without changing a shape of the detected closed region.

6 Claims, 15 Drawing Sheets

IMAGE FORMING APPARATUS AND IMAGE FORMING METHOD

BACKGROUND OF THE INVENTION

1. Field of the Invention

The present invention relates to an image processing technique, and particularly relates to a color-shift correction at the time of serial transfer of multiple color images formed by developer units provided for the respective colors.

2. Description of the Related Art

In recent years, among electrophotographic color image forming apparatuses, an increasing number of color image forming apparatuses include as many developers and photoconductors as color materials and employ a system in which different color images are serially transferred onto an image conveyor belt and a recording medium, so that image forming can be speeded up.

While use of this system (tandem system) can considerably shorten the throughput time, there arises a problem attributable to defects such as non-uniformity or poor attachment position accuracy of a lens of a deflection scanner, and poor assembling position accuracy of the deflection scanner itself to the image forming apparatus. Specifically, such defects make scan lines inclined or curved, and the degree of the inclination or the curve differs among the colors. This causes a problem of a color shift due to displacements of the color images on paper on which the images are transferred. Consequently, it is difficult to obtain a high quality color image.

To cope with the color shift, for example, Japanese Patent Laid-Open No. 2002-116399 describes a method in which, in an assembling process of a deflection scanner, the degree of the curving of a scan line is measured by using an optical sensor, and the lens is mechanically turned to adjust the curving of the scan line and then is fixed.

Japanese Patent Laid-Open No. 2003-241131 describes a method in which, in a process of assembling a deflection scanner to an image forming apparatus, the degree of the curving of a scan line is measured by using an optical sensor, and the deflection scanner is mechanically tilted to adjust the curving of the scan line, and then is assembled to the image forming apparatus.

In this respect, in order to correct an optical path of an optical system, it is necessary to adjust a position of a test toner image by mechanically operating an optical error correction system including a light source and an f-θ lens, a mirror on the optical path, and the like. Accordingly, the methods described in Japanese Patent Laid-Open Nos. 2002-116394 and 2003-241131 require a highly accurate movable member, thus leading to a high cost.

Furthermore, it takes a long time to complete a correction of an optical path in an optical system, and thus frequent correction is impossible. Besides, the shift in the optical path length changes due to an influence by a temperature rise or the like of the machine. For this reason, even though a correction is performed at a certain time point, the influence by the temperature rise of the machine cannot be eliminated. Thus, it is difficult to prevent the color shift by correcting the optical path of the optical system.

Meanwhile, Japanese Patent Laid-Open No. 2004-170755 describes a method in which the degree of the inclination and curving of a scan line is measured by using an optical sensor, bitmap image data is corrected so that the inclination and curving can be cancelled out, and then an image is formed from the corrected image data. In the method, since image data is processed for an electrical correction, neither a mechanical adjustment member nor an adjusting step in assembling process is required. In this respect, it is possible to cope with a color shift at a lower cost in this method than in the methods described in Patent Laid-Open Nos. 2002-116394 and 2003-241131.

The electrical color-shift correction is divided into a one-pixel-basis correction and a less-than-one-pixel-basis correction. In the one-pixel-basis correction, a pixel is offset (crosses over) in a sub scanning direction on a one-pixel basis in accordance with a correction amount for an inclination and a curve. In the less-than-one-pixel-basis correction, tone values of preceding and succeeding pixels in the sub scanning direction are corrected. Implementation of the less-than-one-pixel-basis correction solves the problem of an unnatural step at an offset boundary occurring due to the one-pixel-basis correction, thus achieving smoothing out of an image.

However, as one of adverse effects of the aforementioned electrical color-shift correction, there can be cited non-uniformity (irregularity) in density of a fine image involved with the less-than-one-pixel-basis correction.

FIG. 1 is a diagram illustrating non-uniformity in density of a fine image. In FIG. 1, an input image 101 is a thin line having a constant tone value. When an image 102 is actually formed by performing a color-shift correction on the input image 101, an outputted image after the color-shift correction is a thin line image having non-uniform density, even though the input image 101 has the constant image tone value. This is because an electrophotographic image forming apparatus is generally poor at forming an isolated pixel while maintaining a proportional relationship between an image tone value and an actual image density value. A fine image formed of such a thin line remarkably exhibits influence of the poorness as non-uniformity in density.

One of remedies for the non-uniformity in density of a fine image is to avoid performing the less-than-one-pixel-basis correction on the fine image. Specifically, the image is binarized, and the binarized image is compared with a smoothing judgment pattern stored in advance. When the image matches the pattern, the less-than-one-pixel-basis correction is not performed. When the image does not match the pattern, the less-than-one-pixel-basis correction is performed.

However, when the less-than-one-pixel-basis correction is not performed, there occurs an unnecessary step (bump) at the offset boundary due to the one-pixel-basis correction as described above. Such a step generated by the offset is noticeable particularly in a fine image in which characters in small point size are drawn or a fine pattern is repeatedly drawn.

SUMMARY OF THE INVENTION

An object of the present invention is to provide an image forming apparatus and an image forming method which are capable of reducing a step and non-uniformity in density, of a drawing object, caused by offsetting for an electrical color-shift correction.

An image forming apparatus according to the present invention includes a unit for determining a changing (crossover) coordinate of a main scanning direction for correcting a color shift in a sub scanning direction occurring in forming a generated image into an image, in accordance with a shift amount of the color shift; a unit for detecting a closed region from among drawing objects whose image is formed, the closed region lying across the determined changing coordinate and formed of a plurality of color pixels neighboring each other; and a unit for performing a changing by using the determined changing coordinate without changing a shape of the detected closed region.

The present invention can provide an image forming apparatus and an image forming method which are capable of reducing a step and non-uniformity in density, of a drawing object, caused by offsetting for an electrical color-shift correction.

Further features of the present invention will become apparent from the following description of exemplary embodiments (with reference to the attached drawings).

DESCRIPTION OF THE EMBODIMENTS

Hereinbelow, best modes for carrying out the invention will be described by using the drawings.

Note that a case where the invention is applied to a color laser printer using CMYK color materials will be described in the embodiments below. However, the scope of the invention is not limited to this. The invention is applicable to any electrophotographic image forming apparatus using toner, such as an electrophotographic digital color copier and a color fax machine, without departing from the gist of the present invention.

Embodiment 1

An embodiment of the invention will be described with reference to the drawings.

Figure 1:
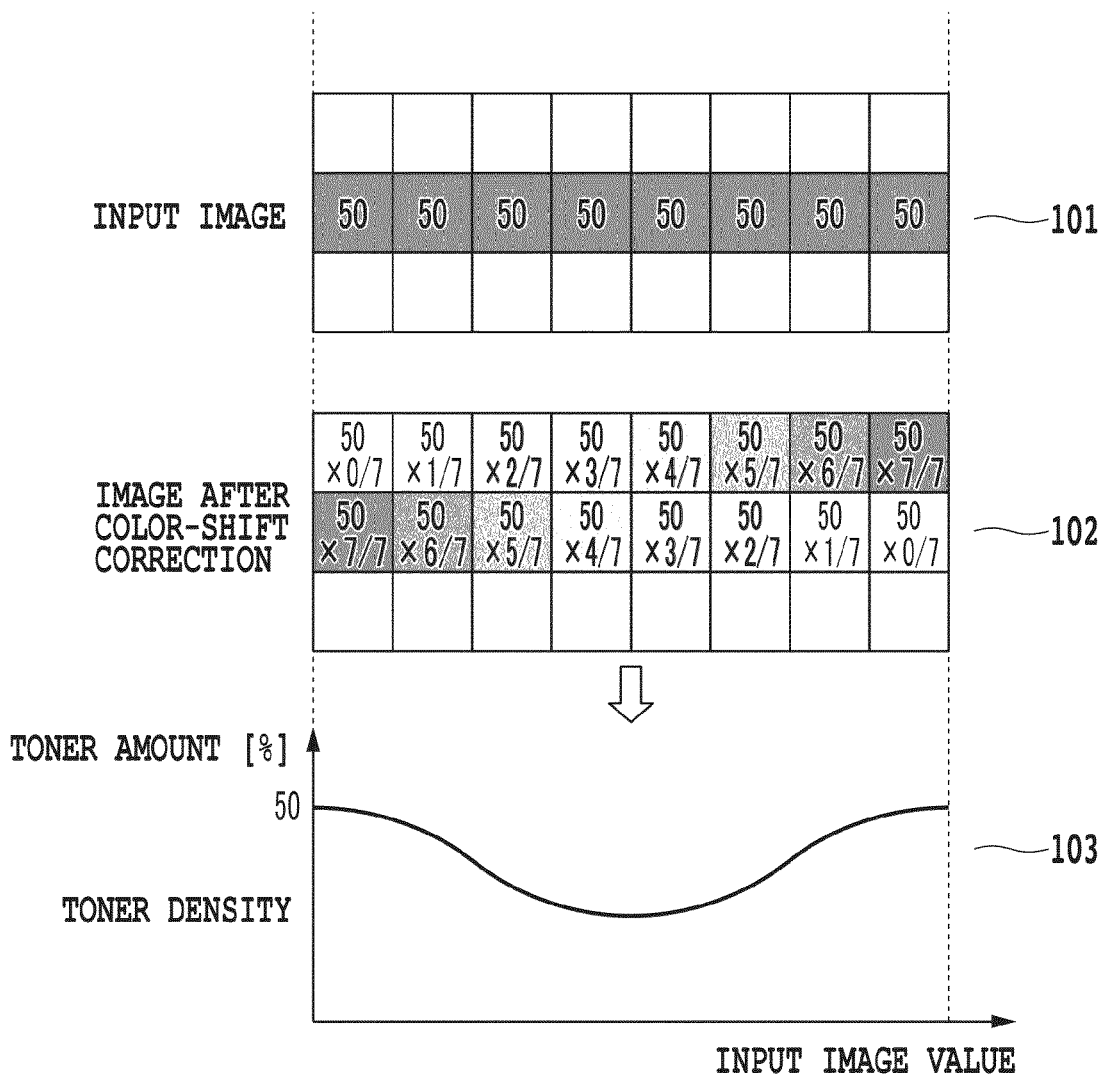
FIG. 1 is a diagram illustrating non-uniformity in density of a fine image.
Figure 2:
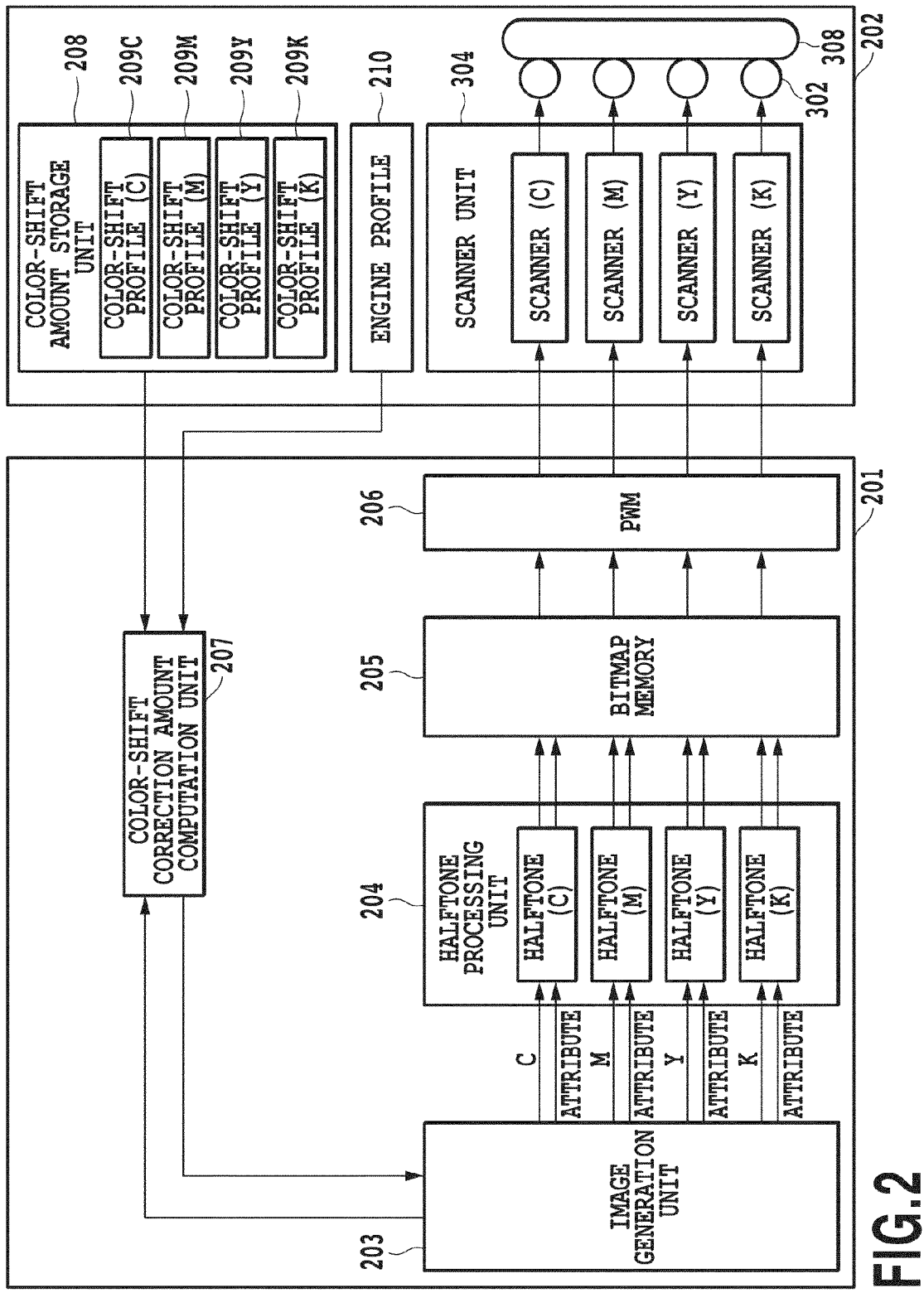
FIG. 2 is a block diagram illustrating a configuration of an image forming apparatus according to a first embodiment of the present invention.

FIG. 2 is a block diagram illustrating a configuration of a part related to latent image generation in an image forming apparatus according to a first embodiment of the invention. The image forming apparatus includes an image processing unit 201 and an image forming unit 202. The image processing unit 201 generates bitmap image data and then performs halftone processing thereon. Thereafter, the image forming unit 202 forms an image on a recording medium based on the data.

[Image Forming Unit]

Figure 3:
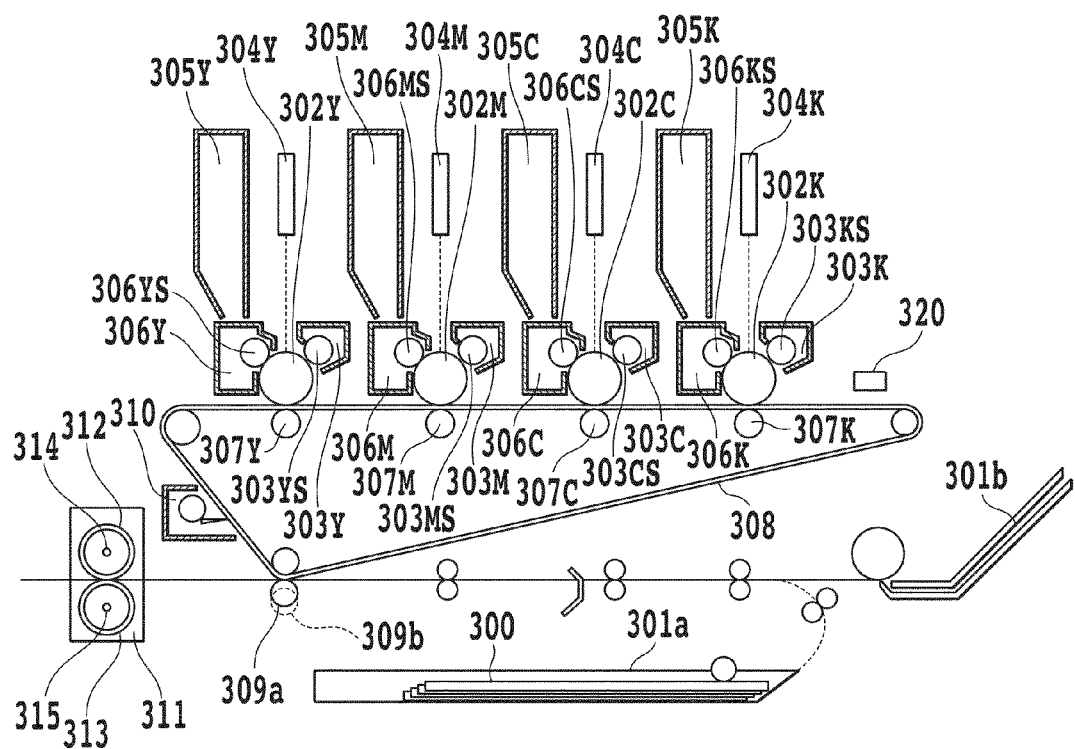
FIG. 3 is a cross-sectional diagram of a tandem color image forming apparatus.

FIG. 3 is a cross-sectional diagram of a tandem color image forming apparatus using an intermediate transfer body, the apparatus taken as an example of an electrophotographic color image forming apparatus. By using FIG. 3, a description is given of an operation of the image forming unit 202 in the electrophotographic color image forming apparatus. The image forming unit 202 drives exposure light according to an exposure time period outputted from the image processing unit 201 to form an electrostatic latent image, and develops the electrostatic latent image to form a single-color toner image for each color. The image forming unit 202 superimposes the single-color toner images on one after another to form a multi-color toner image, transfers the multicolor toner image onto a recording medium 300, and then fixes the multi-color toner image on the recording medium 300. A charge unit includes four charge injection units 303Y, 303M, 303C, and 303K for charging photoconductors 302Y, 302M, 302C, and 302K for yellow (Y), magenta (M), cyan (C), and black (K) stations, respectively. The charge injection units 303Y, 303M, 303C, and 303K are respectively provided with sleeves 303YS, 303MS, 303CS, and 303KS.

The photoconductors 302Y, 302M, 302C, and 302K are each formed by applying an organic photoconduction layer on an outer circumference of an aluminum cylinder, and made rotatable with a driving force transmitted from an unillustrated drive motor. The drive motor is capable of rotating the photoconductors 302Y, 302M, 302C, and 302K counterclockwise in accordance with an image forming operation.

An exposure unit is configured to form the electrostatic latent images by selectively expose surfaces of the photoconductors 302I, 302M, 302C, and 302K to exposure light emitted from scanner units 309Y, 304M, 304C, and 304K thereto, respectively.

A developer unit includes four developers 306Y, 306M, 306C, and 306K by which developments in yellow (Y), magenta (M), cyan (C), and black (K) are performed at the respective stations so as to make the electrostatic latent images visible. The developers 306Y, 306M, 306C, and 306K are provided with sleeves 306YS, 306MS, 306CS, and 306KS. Note that the developers 306Y, 306M, 306C, and 306K are detachable from the stations, respectively.

A transfer unit rotates an intermediate transfer body 308 clockwise so that the single-toner images can be transferred onto intermediate transfer body 308 from the respective photoconductors 302Y, 302M, 302C, and 302K. The transfer unit transfers the single-toner images onto the respective intermediate transfer body 308 with the rotation of primary transfer rollers 307Y, 307M, 307C, and 307K which are arranged so as to face the photoconductors 302Y, 302M, 302C, and 302K.

When an appropriate bias voltage is applied to each of the primary transfer rollers 307Y, 307M, 307C, and 307K and when the rotational speed is made different between the photoconductors 302Y, 302M, 302C, and 302K and the intermediate transfer body 308, the single-color toner images are efficiently transferred onto the intermediate transfer body 308 (this is referred to as primary transfer).

Further, the transfer unit superimposes the single-color toner images on one after another on the intermediate transfer body 308 at the respective stations, and conveys the superimposed multi-color toner image to a secondary transfer roller 309 with the rotation of the intermediate transfer body 308. In addition, the transfer unit conveys a recording medium 300 from a paper supply tray 301 (301a or 301b) to the secondary transfer roller 309 while nipping the recording medium 300, and then transfers, onto the recording medium 300, the multi-color toner image on the intermediate transfer body 308. At this time, an appropriate bias voltage is applied to the secondary transfer roller 309, and thereby the multi-color toner image is electrostatically transferred on the recording medium 300 (this is referred to as secondary transfer). The secondary transfer roller 309 comes into contact with the recording medium 300 at a position 309a while the multi-color toner image is being transferred on the recording medium 300, and comes away from the recording medium 300 at a position 309b after the processing.

A fuser unit includes a fuser roller 312 for heating the recording medium 300 and a pressure roller 313 for bringing the recording medium 300 into pressure contact with the fuser roller 312 so that the multi-color toner image transferred on the recording medium 300 can be fused and fixed on the recording medium 300. The fuser roller 312 and the pressure roller 313 are each formed hollow. Heaters 314 and 315 are provided inside the fuser roller 312 and the pressure roller 313, respectively. While the fuser roller 312 and the pressure roller 313 convey the recording medium 300 holding the multi-color toner image thereon, a fuser 311 applies heat and pressure to the recording medium 300 to fix the toner onto the recording medium 300.

The recording medium 300 with the toner fixed thereon is subsequently discharged to an unillustrated paper discharge tray by using discharge rollers, so that the image forming operation is terminated.

A cleaning unit 310 is provided for cleaning the toner remaining on the intermediate transfer body 308. Waste toner which remains after the four-color toner image formed on the intermediate body 308 is transferred onto the recording medium 300 is accumulated in a cleaner container.

Color-shift detection sensors 320 are arranged at positions where the color-shift detection sensors 320 face the intermediate transfer body 308. Color-shift detection patches are formed on the intermediate transfer body 308, and thus the color-shift detection sensors 320 are capable of judging an amount of color-shift of each color from detection timings of the patches.

Figure 4:
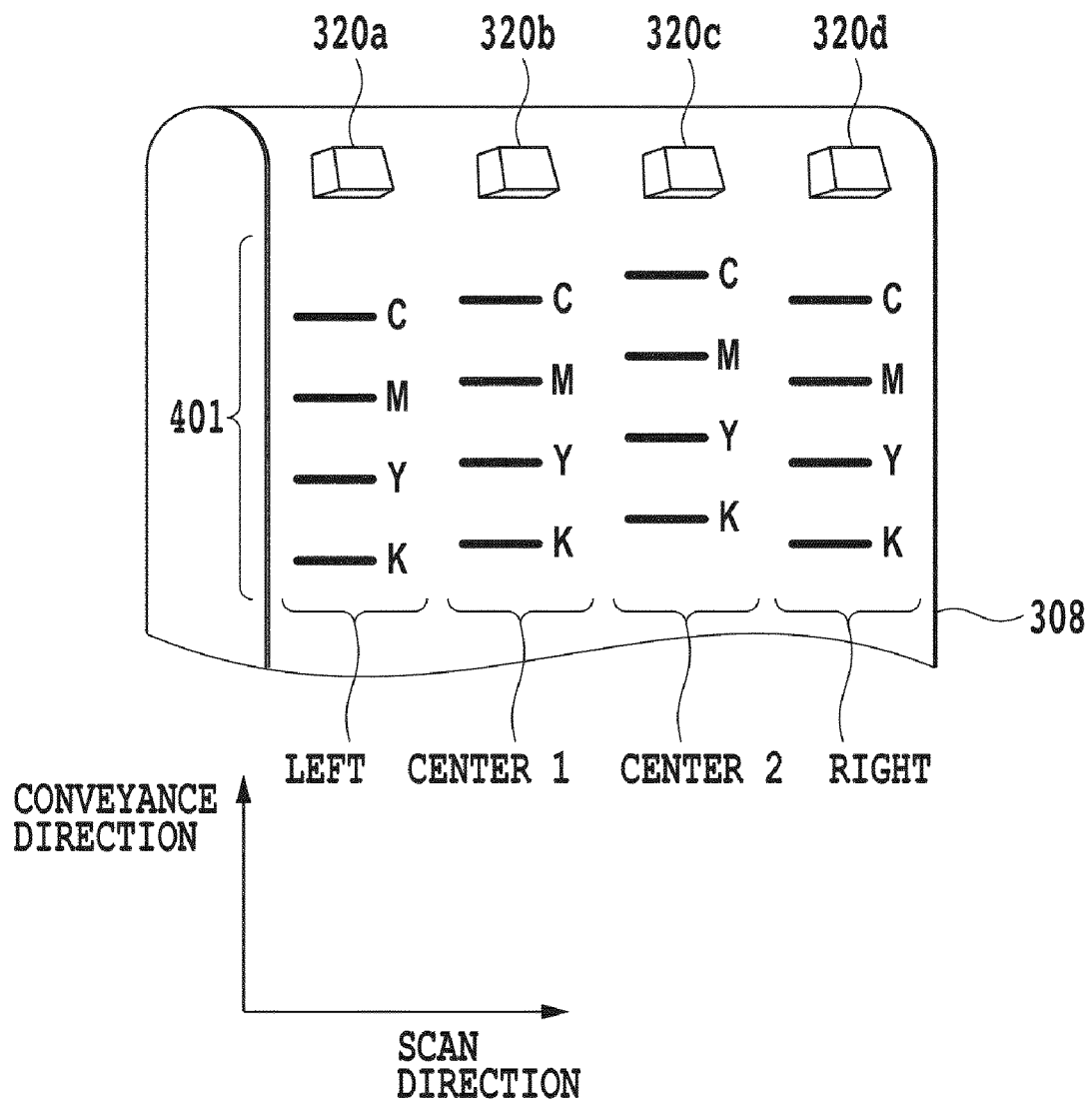
FIG. 4 is a diagram showing an example of color-shift detection.

FIG. 4 is a diagram showing an example of color shift detection. Four color-shift detection sensors 320a, 320b 320c and 320d are provided in a scan direction above the intermediate transfer body 308. The intermediate transfer body 308 moves in a conveyance direction of the recording medium 300, and CMYK color-shift detection patches 401 formed on the intermediate transfer body 308 pass below the color-shift detection sensors 320. Each color-shift detection sensor 320 is configured to be capable of detecting the detection patches 401 passing below the color-shift detection sensor 320.

As shown in FIG. 4, the color-shift detection sensors 320 detect color shifts at four positions, i.e., the left, the center 1, the center 2, and the right, in the scan direction, respectively. Thereby, the degrees of an inclination and a curve of a scan line can be obtained under control of an unillustrated CPU. Some color image forming apparatus, which have a configuration in which the color-shift detection sensors 320 are provided at the right and left positions only, can obtain only the degree of an inclination.

Figure 5:
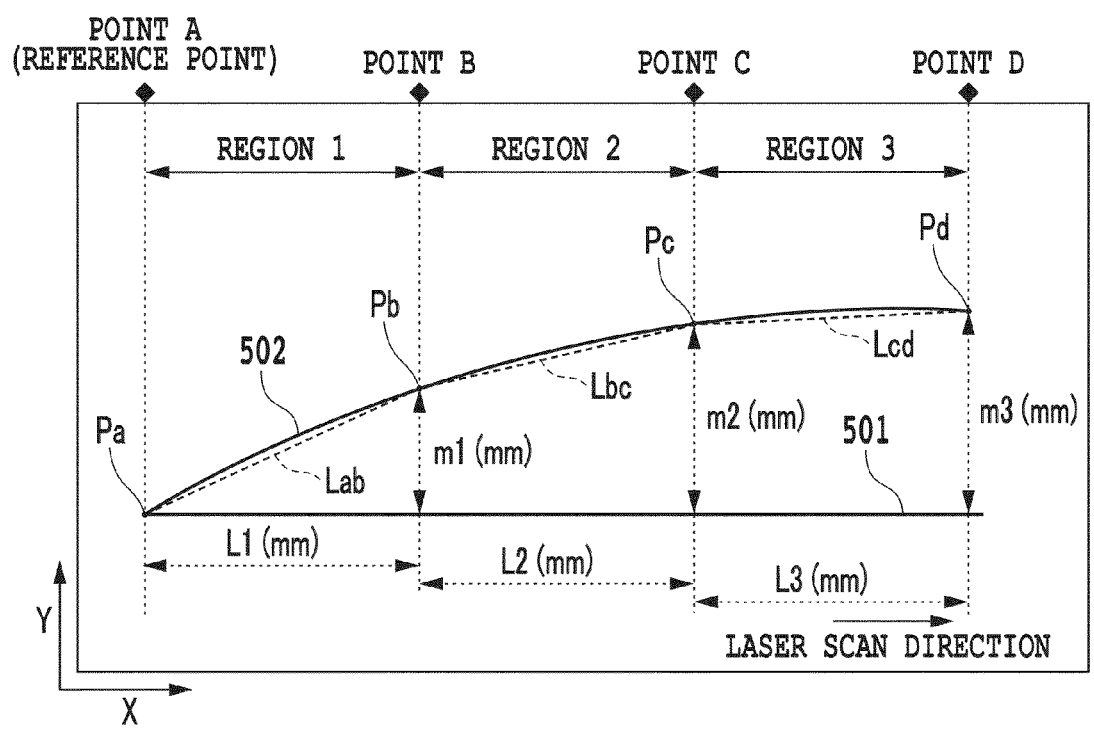
FIG. 5 is a diagram illustrating a color shift in a main scanning line.

FIG. 5 is a diagram illustrating a color-shift in a sub scanning direction caused by an inclination or a curve of the main scanning line, the color-shift being detected by the color-shift detection sensors 320. Reference numeral 501 in FIG. 5 denotes an ideal scan line, and scan is performed perpendicular to a rotation direction of the photoconductors 302. Reference numeral 502 denotes an actual scan line having an inclination and a curve attributable to poor positional accuracy or a displacement of a diameter of a corresponding one of the photoconductors 302 and poor positional accuracy of an optical system in a corresponding one of the scanner units 304 for the respective colors.

Since the degrees of such an inclination and curve of the scan line differ among the CMYK image stations, a color shift occurs in an image obtained by transferring the four color toner images on the intermediate transfer body 308. A main scanning direction (X direction) corresponds to a laser scan direction, while the sub scanning direction (Y direction) corresponds to the conveyance direction of a recording medium.

A point A which is a scan start position in an image forming region is referred to as a reference point (Pa). Amounts of shifts (m1, m2, and m3) in the sub scanning direction (Y direction) between the ideal scan line 501 and the actual scan line 502 are measured at multiple points (B, C, and D) at intervals in the main scanning direction, and points on the scan line 502 corresponding to the points (B, C, and D) are referred to as Pb, Pc, and Pd.

A scan area is divided into a region 1 (between the points Pa and Pb), a region 2 (between the points Pb and Pc) and a region 3 (between the points Pc and Pd) in the main scanning direction (X direction), and lines connecting the points are referred to as Lab, Lbc, and Lcd, respectively. An increment of a shift amount in the sub scanning direction (Y direction) in the region 1 is m1, an increment of a shift amount in the region 2 is m2−m1, and an increment of a shift amount in the region 3 is m3−m2. When the regional lengths of the regions 1, 2 and 3 are L1, L2 and L3, respectively, inclinations of the lines Lab, Lbc, and Lcd can be obtained based on the increments m1, m2−m1, and m3−m2 and the regional lengths L1, L2 and L3.

When the increment of the shift amount takes on a positive value, the scan line in the corresponding region shows an inclination towards upper right (+). When the increment of the shift amount takes on a negative value, the scan line in the corresponding region shows an inclination towards lower right (−).

[Image Processing Unit]

Next, a description is given of processing by the image processing unit 201 in the color imaging forming apparatus in FIG. 2. In FIG. 2, an image generation unit 203 generates bitmap image data which can be subjected to print processing, from print data received from an unillustrated computer or the like. Here, the print data is generally provided in a printer description language for generating page image data, the printer description language being called page description language (PDL). The print data generally includes drawing commands for data for text, graphics, and an image and the like. The bitmap image data is generated by analyzing such print data and by performing rendering on the print data.

In this embodiment, the image generation unit 203 analyzes drawing commands in the PDL, and corrects a color shift due to an inclination and a curve of a scan line on the basis of computation results of a color-shift correction-amount computation unit 207, the computation results obtained based on positional information of drawing objects.

At this time, in a case where the image generation unit 203 receives print data which is RGB color-space image data and is to input image data corresponding to four CMYK color materials to the image forming unit 202, the image generation unit 203 concurrently executes color conversion processing as well. Specifically, the image generation unit 203 executes color conversion processing in which RGB color-space image data is converted into CMYK color-space image data by referring to a look-up table or the like. The image generation unit 203 performs a color-shift correction on the CMYK color-space image data thus subjected to the color conversion processing.

In addition, when generating the bitmap image data, the image generation unit 203 concurrently generates attribute information indicating which image characteristic each pixel belongs to, on the basis of the analysis result of each drawing command. Here, the attribute information means information for identifying the type of data corresponding to an image characteristic.

Examples of attribute information includes: a text attribute formed of text data or data having an image characteristic of text data; an image attribute formed of a natural image or data having an image characteristic of a natural image; a graphic attribute formed of drawing data or data having an image characteristic of drawing data; and the like. Adding the attribute information to each pixel of bitmap image data makes it possible to execute image processing suitable for the corresponding image characteristic of the attribute.

In this embodiment, since color-shift corrections are performed on image data for CMYK, the attribute information is also generated for each pixel of bitmap image data corresponding to any of CMYK. The color-shift correction processing by the image generation unit 203 will be described in detail later.

A halftone processing unit 204 executes processing for reducing the number of tones of inputted pixel data. In many cases, the image forming unit 202 is capable of receiving only low level tone data such as 2, 4 or 16 tones. Thus, the halftone processing unit 204 performs processing for reducing the tones so that even the image forming unit 202 capable of reproducing a small number of tones can perform stable expression in intermediate tones. Specifically, the halftone processing unit 204 is configured to perform screen processing or an error diffusion process. In the screen processing, image data is processed into N-value-based data by using a predetermined multiple dither matrix and inputted image data (value M>value N in the image data subjected to the halftone processing). In contrast, in the error diffusion process, image data is processed into N-value-based data by comparing input image data with a predetermined threshold, and a difference between the input image data and the threshold at that time is diffused among neighboring pixels to be subjected to N-value-based processing subsequently. Note that the halftone processing unit 204 is capable of performing different halftone processing based on the attribute information, depending on the attribute. In this case, the halftone processing unit 204 can employ halftone processing in which a tone is given priority in a natural image having an image attribute. In addition, the halftone processing unit 204 can employ halftone processing in which a resolution is given priority in text having a text attribute and a line having a graphic attribute.

The halftone processing unit 204 accumulates the bitmap image data after the halftone processing for each color in a bitmap memory 205. The bitmap memory 205 temporarily stores therein the bitmap image data to be subjected to the print processing, and can be formed of a page memory which stores image data having one page or of a band memory which saves data having multiple lines.

The bitmap image data accumulated in the bitmap memory 205 is converted, in a pulse width modulation (PWM) unit 206, into an exposure time period imputable into the scanner units 304 in the image forming unit 202.

Subsequently, processing by the image generation unit 203 will be described by using a flowchart.

Figure 6:
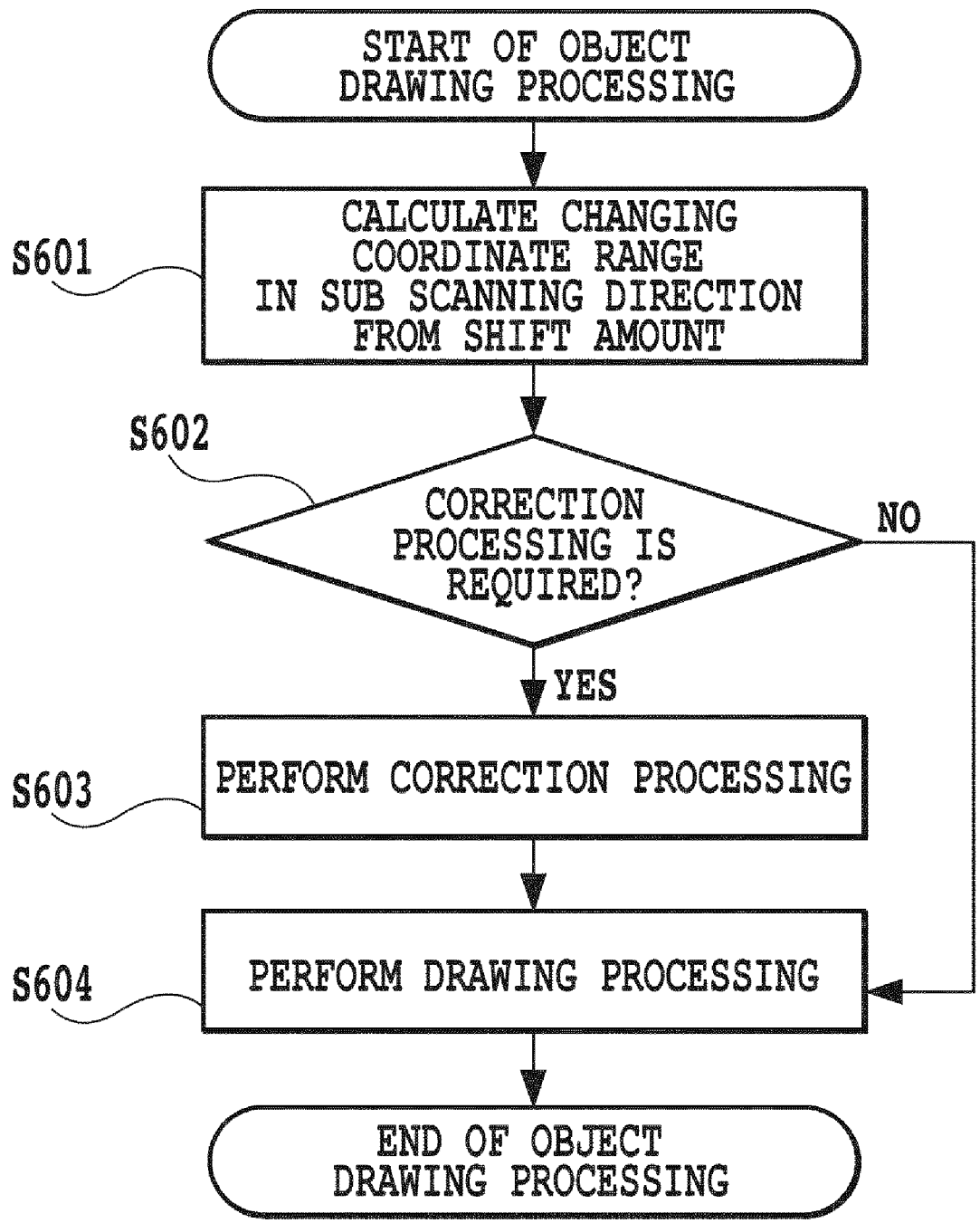
FIG. 6 is a flowchart showing drawing processing according to the embodiment of the present invention.

FIG. 6 is a flowchart explaining drawing processing for each of drawing objects to be drawn by the drawing commands included in the print data.

Firstly, the image generation unit 203 calculates (determines) an offset position (hereinafter, referred to as a changing coordinate) on the bitmap image generated by the image generation unit 203 by referring to the color-shift amount obtained as described above (S601). Further, the image generation unit 203 concurrently calculates an allowable range of the changing coordinate as well in S601. Here, the allowable range of the changing coordinate is calculated from the shift amount described by referring to FIG. 5 and the resolution of the bitmap data to be generated. The allowable range of the changing coordinate will be described later by referring to FIG. 7.

Next, the image generation unit 203 judges whether or not correction processing is required for a currently processed one of the drawing objects included in the print data (S602). The judgment processing will be described later in detail by referring to FIG. 8 and the like.

Subsequently, the image generation unit 203 performs the correction processing on the drawing object judged in S602 as requiring the correction processing (S603). The correction processing will be described later in detail by referring to FIG. 12 and the like.

Thereafter, the image generation unit 203 draws the drawing object on the page memory or the band memory (S604). The image generation unit 203 performs the processing from S601 to S604 on all the drawing objects included in the print data.

Figure 7:
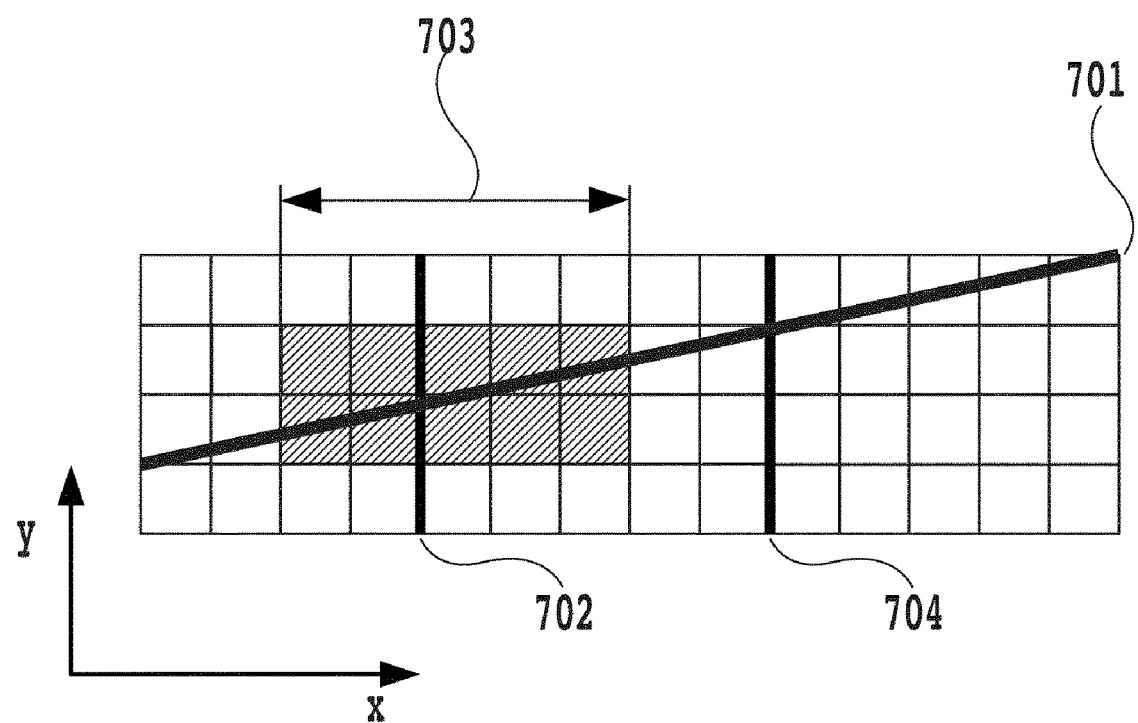
FIG. 7 is a diagram illustrating an allowable range of a changing coordinate.

FIG. 7 is a diagram for explaining the allowable range of the changing coordinate calculated in S601 in FIG. 6. A square in FIG. 7 represents a pixel. A line 701 corresponds to the lines Lab, Lbc, and Lcd in FIG. 5. When the resolution is specified, coordinates y of the line 701 for respective coordinates x are calculated as continuous values. In contrast, when the resolution is specified, coordinates on the line 701 take discrete values. In order to offset a generated image, the most preferable coordinates X are coordinates X (702) and (704) at each of which a coordinate Y of the line 701 changes by one pixel. Meanwhile, when the line 701 is discretized, the coordinate Y, of the line 701, in a range (703) is the same as the coordinate Y, of the line 701, with respect to the coordinate X (702). Even if a changing coordinate is offset by approximately several pixels in the range (703), there is no substantial problem (in other words, a color-shift correction can be performed without any problem). In this embodiment, such a range is referred to as an allowable range of a changing coordinate.

Figure 8:
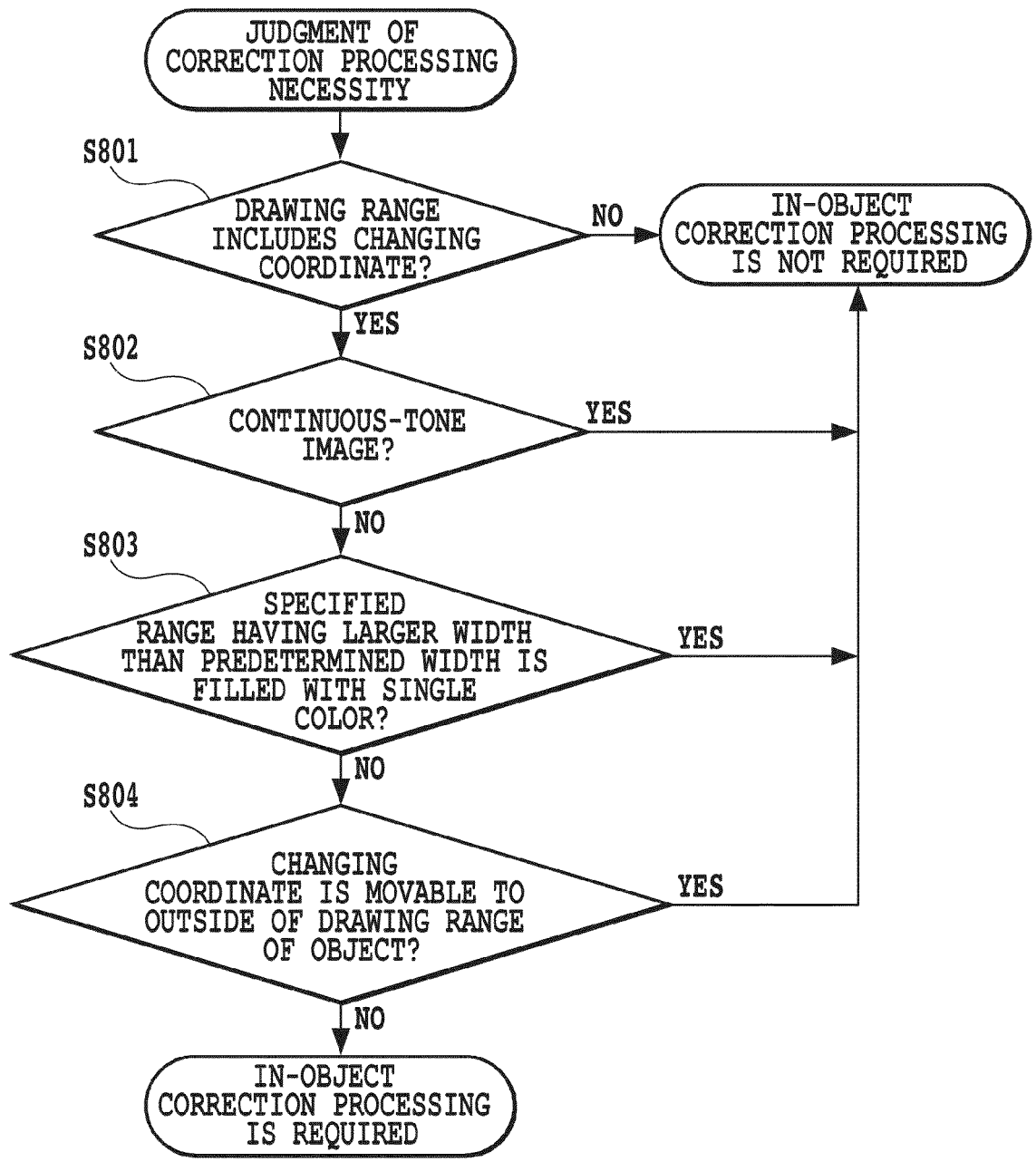
FIG. 8 is a flowchart showing processing of judging the necessity of correction processing of the present invention.

Subsequently, the judgment in S602 of necessity of the correction processing for the currently processed object (target drawing object) will be described by using a flowchart in FIG. 8.

Firstly, the image generation unit 203 calculates positions, of the target drawing object, on a bitmap that the image generation unit 203 generates in the last step, and judges whether or not a changing coordinate is included in a range defined by the calculated positions (S801). If the changing coordinate is not included in the drawing range of the object, the image generation unit 203 does not perform the correction on the drawing object.

If the changing coordinate is included in the drawing range of the drawing object, the image generation unit 203 judges whether or not the target drawing object is a continuous-tone image (S802). If the drawing object is a continuous-tone image, the image generation unit 203 does not perform the correction on the drawing object.

If the drawing object is not a continuous-tone image, the image generation unit 203 then judges whether or not the target drawing object is filled with a single color in a specified range having a larger width in the sub scanning direction than a predetermined width (S803). If the target drawing object is filled with a single color in a specified range having a larger width in the sub scanning direction than a predetermined width, the image generation unit 203 does not perform the correction on the drawing object.

If the target drawing object is not filled with a single color in a specified range having a larger width in the sub scanning direction than a predetermined width, the processing proceeds to S804. In S804, the image generation unit 203 judges whether or not the changing coordinate included in the drawing range of the drawing object can be moved to the outside of the drawing range of the drawing object by moving the changing coordinate within the aforementioned allowable range of the changing coordinate.

Figure 12:
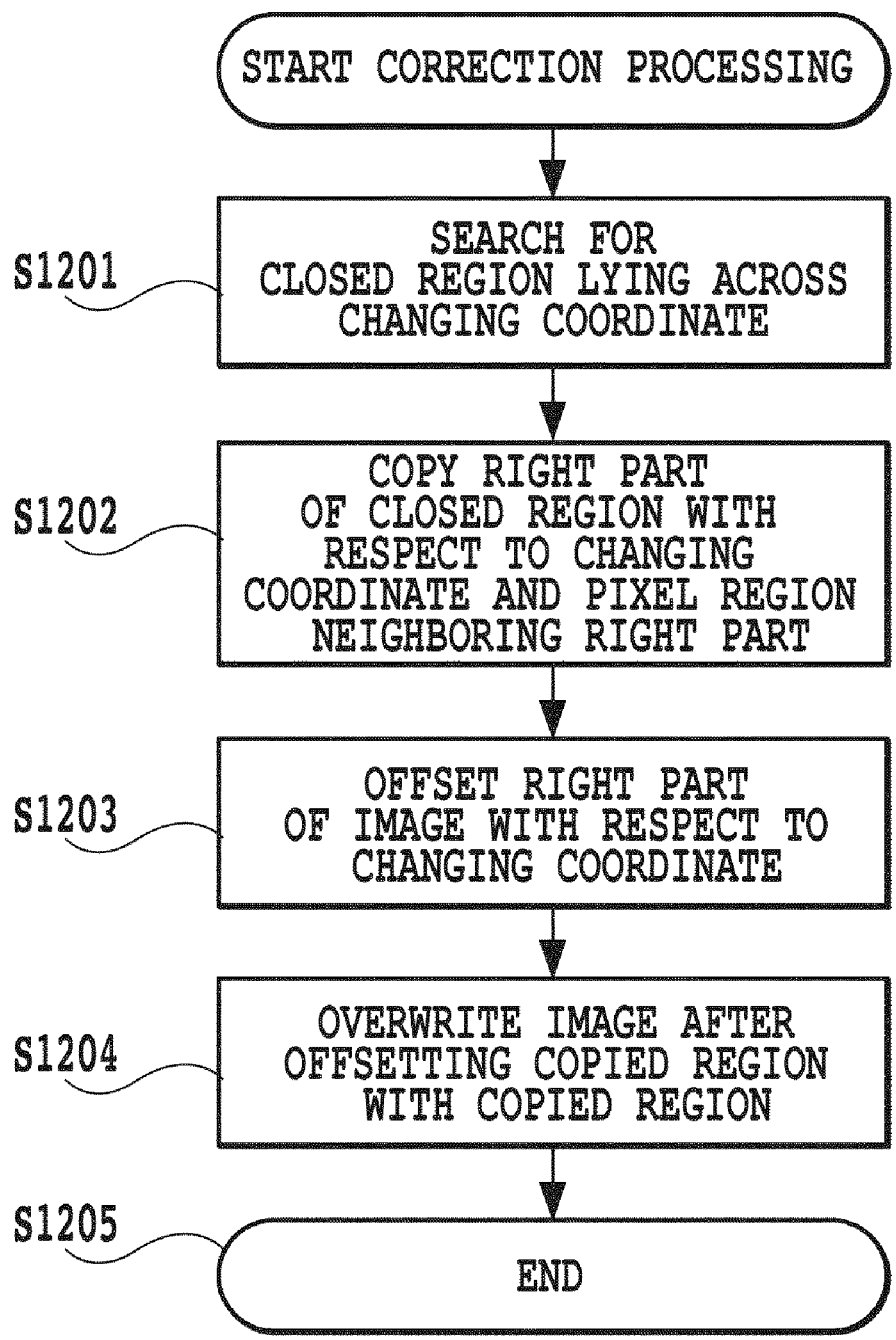
FIG. 12 is a flowchart showing the correction processing of the present invention.

If the changing coordinate included in the drawing range of the drawing object can be moved to the outside of the drawing range of the drawing object (S804), the changing coordinate is set (determined) at a position outside the drawing range of the drawing object. In this case, the image generation unit 203 does not perform the changing on the drawing object, and thus does not perform a color-shift correction using the changing on the drawing object. If the changing coordinate cannot be moved (S804), the image generation unit 203 performs correction processing as shown in FIG. 12 on the drawing object.

Specifically, in processing in S804, the image generation unit 203 firstly judges whether or not a range not including the drawing object exists in the allowable range of the changing coordinate. If such a range is judged as existing, the changing coordinate is set at a position at which the drawing object is not included but which is located within the allowable range of the changing coordinate. Setting the changing coordinate in this manner can reduce deformation of the shape of the drawing object due to a changing for electrical color-shift correction, and thus can check an unnatural step and non-uniformity in density.

Figure 9:
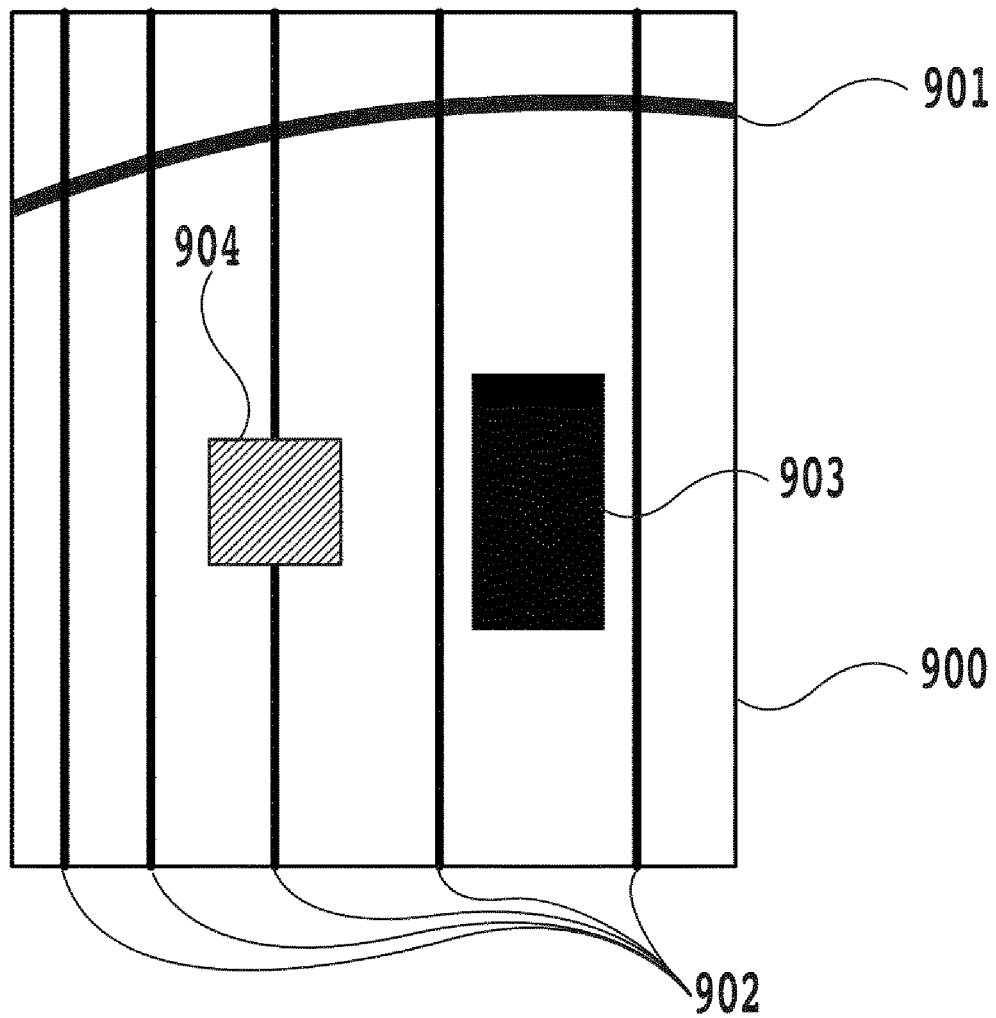
FIG. 9 is a diagram illustrating the necessity of the correction processing of the present invention.

FIG. 9 illustrates a bitmap image generated by the image generation unit 203 and changing coordinates. Reference numeral 901 denotes a line indicating a shift amount, and 902 denotes changing coordinates. There exist five changing coordinates in FIG. 9. The image generation unit 203 does not perform a correction on a drawing object which does not lie across a changing coordinate, like a drawing object 903. This is because a shift is considered not to occur in a region lying between changing coordinates.

Figure 10:
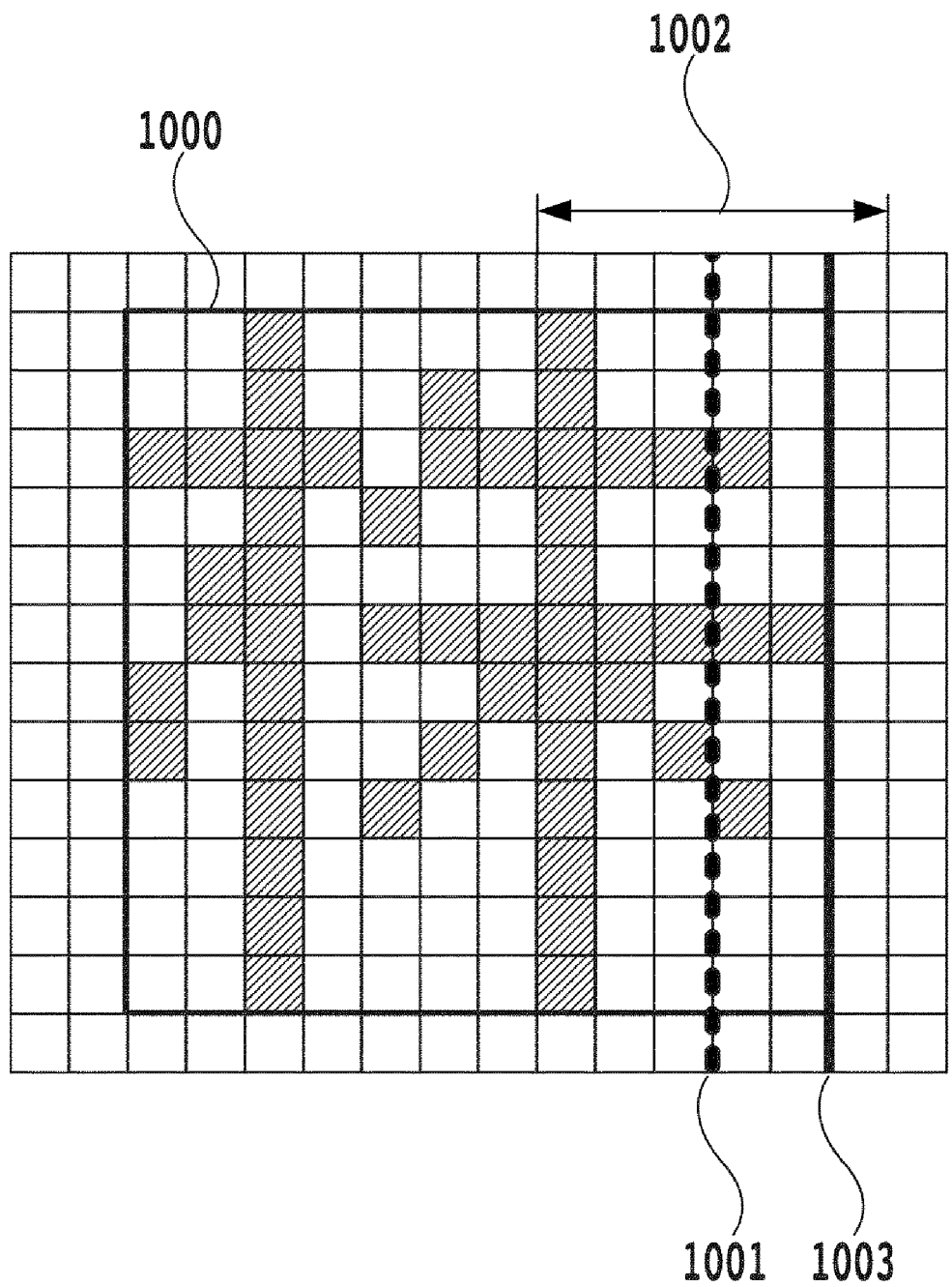
FIG. 10 is a diagram illustrating the necessity of the correction processing of the present invention.

In contrast, for a drawing object lying across at least one changing coordinate, like a drawing object 904, it is judged whether or not a changing coordinate can be considered to be located within the aforementioned allowable range of the changing coordinate but outside the range of a drawing object. For example, suppose a case where a changing coordinate 1001 is included in a bounding box 1000 of a drawing object, as shown in FIG. 10. Here, a bounding box is a minimum rectangle around a region occupied by a drawing object. In this case, when the allowable range of a changing coordinate, as shown by reference numeral 1002, includes the outside of the bounding box 1000, the image generation unit 203 does not perform a correction. In other words, it can be considered that the changing coordinate is located at a position denoted by reference numeral 1003.

Figure 11:
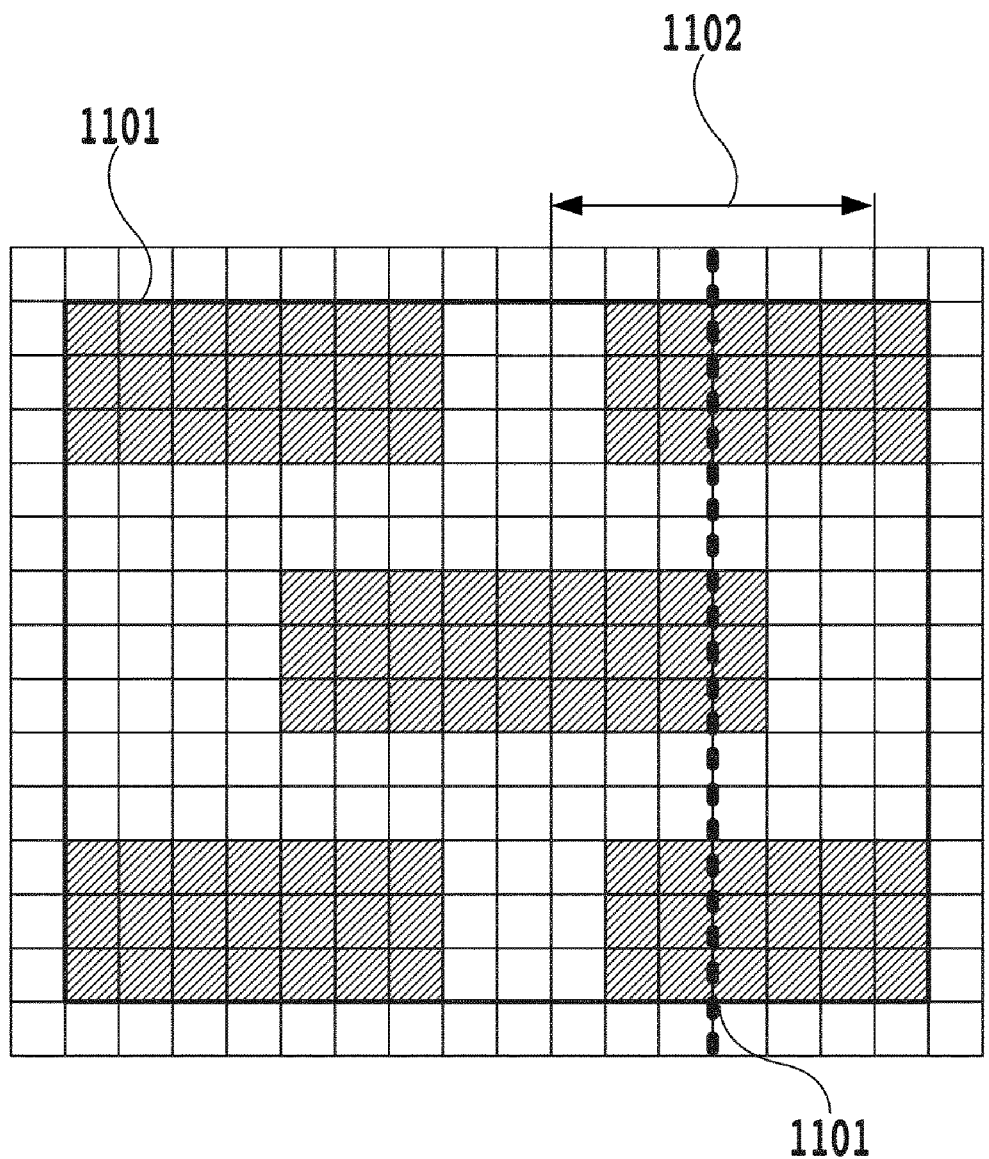
FIG. 11 is a diagram illustrating the necessity of the correction processing of the present invention.

In contrast, as shown in FIG. 11, when a bounding box 1101 of a drawing object includes an allowable range 1102 of a changing coordinate, the image generation unit 203 performs correction processing on the drawing object.

Subsequently, correction processing performed by the image generation unit 203 in the case of FIG. 11 will be described by using a flowchart in FIG. 12 and a diagram in FIG. 13.

Figure 13:
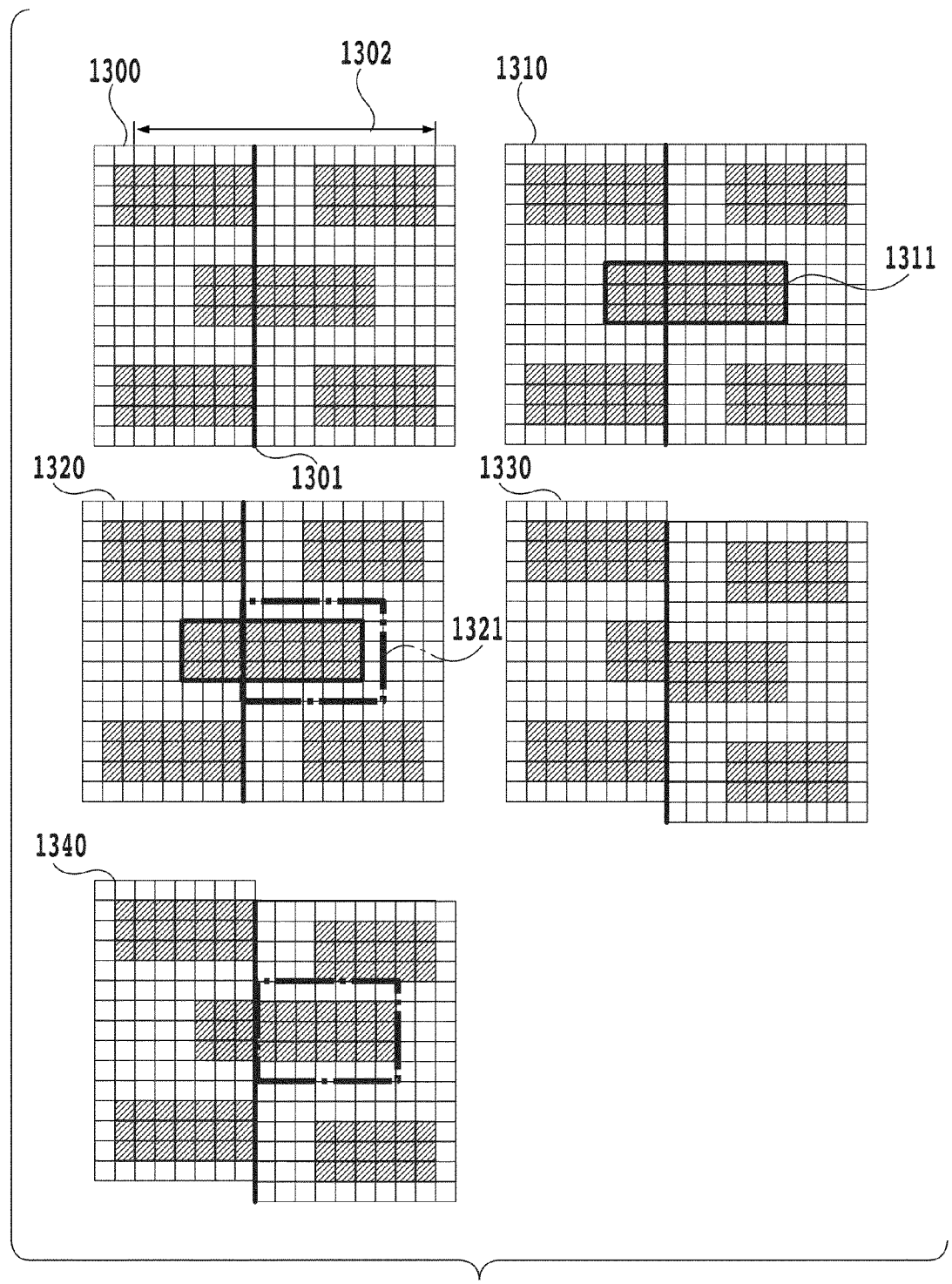
FIG. 13 is a diagram illustrating the correction processing of the present invention.

A drawing object 1300 in FIG. 13 is a drawing object on which correction processing is to be performed. Reference numeral 1301 denotes a changing coordinate, and 1302 denotes an allowable range of the changing coordinate.

Firstly, the image generation unit 203 searches for a closed region which is included in a drawing range of a drawing object for an image to be formed in the last step and which lies across a changing coordinate (S1201). Note that a closed region is a region formed of multiple color pixels neighboring each other. In other words, a closed region lying across a changing coordinate is such a region as denoted by reference numeral 1311 in FIG. 13. Such a closed region can be searched for by applying a general method such as pattern matching thereto.

Then, the image generation unit 203 copies: a region, of the closed region detected by the search in S1201, on the changing side of the changing coordinate; and pixels surrounding the above-described region except pixels on the non-changing side of the changing coordinate (S1202). In other words, the image generation unit 203 copies a region denoted by reference numeral 1321 in FIG. 13.

Subsequently, as shown in reference numeral 1330 in FIG. 13, the image generation unit 203 shifts the region on the right side of the changing coordinate (that is, on the changing side) by one pixel (S1203).

Thereafter, as shown in reference numeral 1340 in FIG. 13, the image generation unit 203 overwrites the original region prior to the changing with the region copied in S1202 (S1204). That is, processing from S1202 to S1204 makes it possible to perform changing at the position of the changing coordinate without changing the shape of the closed region.

As has been described, the processing shown in FIG. 12 makes it possible to maintain the shape of the closed region lying across the changing coordinate as much as possible, and to check an unnatural step and non-uniformity in density due to the changing for electrical color-shift correction.

Note that when the closed region lying across the changing coordinate is searched for in S1201, rendering should be once performed on an object. However, the rendering need not to be performed on the entire drawing object, but may be performed only on a portion corresponding to the allowable region of the changing coordinate. Alternatively, in order to find the closed region, rendering may be preceded by binarization.

Embodiment 2

In the aforementioned first embodiment of the present invention, the received print data is interpreted and corrected, and then the corrected bitmap data is generated. In a second embodiment, received print data is interpreted to generate intermediate data from a PDL, and then a correction is performed on a drawing object included in the intermediate data at the time of printing. This makes it possible to reuse the generated intermediate data by another printer having a different shift amount. Specifically, the PDL is interpreted and a conversion is performed to obtain the intermediate data which is a so-called display list before conversion into bitmap data. Thereby, when any of various printers prints the intermediate data, a color-shift correction can be performed according to a color-shift amount of the printer. With this configuration, a conversion has been performed to obtain intermediate data, so that the PDL need not be interpreted in printing. This enables not only high-speed rendering (bitmap generation) but also a correction of color-shift dependent on a printer.

Figure 14:
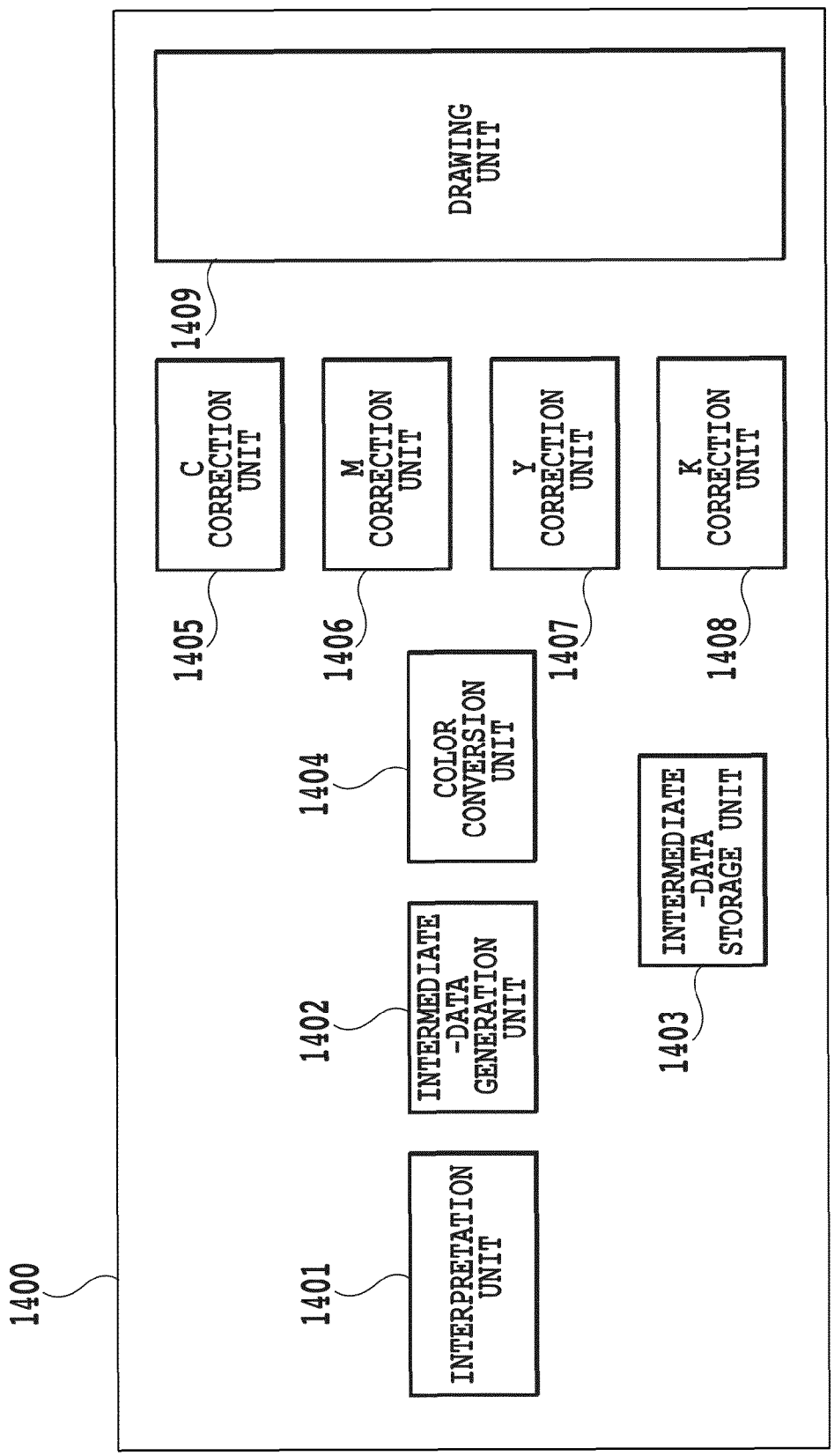
FIG. 14 is a block diagram showing an image forming unit according to a second embodiment of the present invention.

FIG. 14 is a block diagram illustrating an image forming unit according to the second embodiment of the present invention. Reference numeral 1400 denotes the image forming unit; 1401, an interpretation unit; 1402, an intermediate-data generation unit; 1403, an intermediate-data storage unit; 1404, a color conversion unit; 1405, 1406, 1407, and 1408, a C correction unit, an M correction unit, a Y correction unit, and a K correction unit, respectively; and 1409, a drawing unit. The interpretation unit 1401 interprets received data for a printing target (PDL data). The intermediate-data generation unit 1402 generates intermediate data from a result of an interpretation by the interpretation unit 1401. The intermediate-data storage unit 1403 is capable of storing multiple intermediate data pieces generated by the intermediate-data generation unit 1402. In other words, the intermediate-data storage unit 1403 stores therein the intermediate data before a color-shift correction, which is generated from data interpreted by the interpretation unit 1401. The color conversion unit 1404 reads the intermediate data to covert the intermediate data into CMYK color spaces. The C correction unit 1405, the M correction unit 1406, the Y correction unit 1407 and the K correction unit 1408 perform corrections such as color-shift corrections for the respective CMYK color elements. The drawing unit 1409 interprets the corrected intermediate data to form a bitmap image.

The intermediate data generated by the intermediate-data generation unit 1402 is in a format interpretable by the drawing unit 1409, and is configured at least to be processed for each drawing object. The color spaces in the intermediate data are not particularly CMYK color spaces, but may be RGB or YUV color spaces.

The intermediate data stored in the intermediate-data storage unit 1403 can be forwarded to another printer including a drawing unit capable of interpreting intermediate data.

Figure 15:
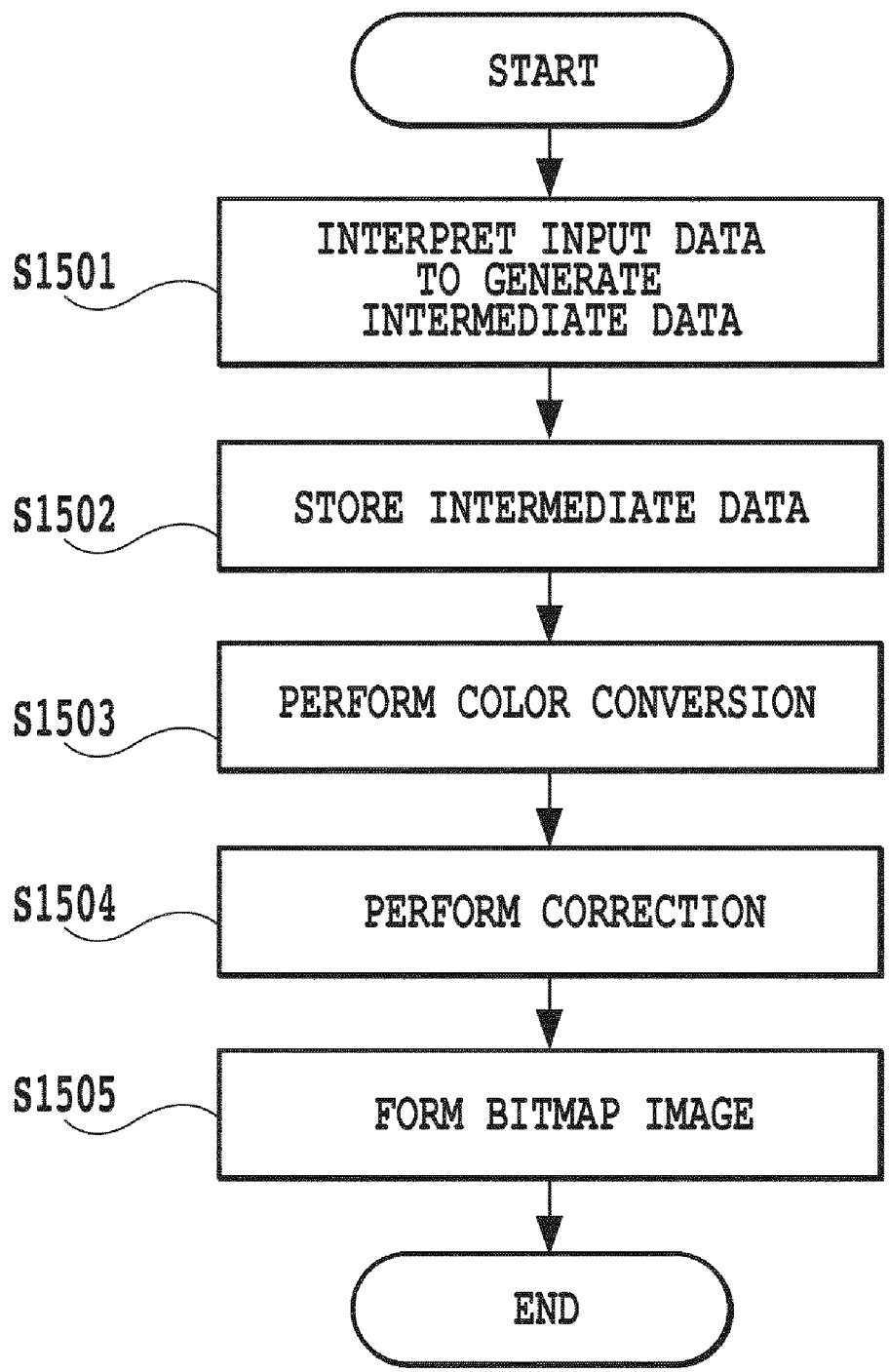
FIG. 15 is a flowchart explaining processing according to the second embodiment of the present invention.

Subsequently, an operation of the image forming unit 1400 will be described by using a flowchart in FIG. 15.

Firstly, the image forming unit 1400 interprets print data received in the interpretation unit 1401, and generates intermediate data in the intermediate-data generation unit 1902 (S1501). Then, the image forming unit 1400 stores the first intermediate data generated in S1501 in the intermediate data storage unit 1403 (S1502). Subsequently, the image forming unit 1400 converts each drawing object in the intermediate data into the CMYK color spaces in the color conversion unit 1404, newly generates second intermediate data for each of the CMYK color spaces, and stores the second intermediate data in the intermediate storage unit 1403 (S1503). The second intermediate data generated in S1503 is corrected by the correction units 1405 to 1408 for respective colors (S1504). Correction processing performed here is the same as the correction processing described in the aforementioned first embodiment. Accordingly, processing shown in FIGS. 8 to 12 is performed on the second intermediate data. Correction results are converted into an intermediate data format interpretable by the drawing unit 1409 and are forwarded to the drawing unit 1409. The drawing unit 1409 receives the intermediate data corrected as described above to form bitmap images for respective CMYK color spaces (S1505). The bitmap images thus formed for respective CMYK color spaces are subjected to halftone processing as in the aforementioned first embodiment, and accumulated in a bitmap memory.

In addition, the intermediate data stored in the intermediate-data storage unit 1403 in S1502 and S1503 may be transmitted to another image forming apparatus having the same configuration as that shown in FIG. 2, and then be subjected to the correction processing described in the first embodiment by the different image forming apparatus. This makes it possible for another printer having a different shift amount to reuse the generated intermediate data.

Other Embodiment

The present invention can also be achieved by executing the following processing. Specifically, software (a program) for implementing the functions of the aforementioned embodiments is provided to a system or an apparatus via network or various recording media. The processing is reading and executing the program by the system or a computer (or a CPU, an MPU, or the like) of the apparatus.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the preset invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-268853, filed Nov. 26, 2009, which is hereby incorporated by reference herein in its entirety.

What is claimed is:

1. An image forming apparatus comprising:
a unit for determining a changing coordinate in a main scanning direction for correcting a color shift in a sub scanning direction on the basis of a shift amount of the color shift, the color shift expected to occur in image formation of a generated image;
a unit for detecting a closed region from a drawing object based on which the image is formed, the closed region lying across the determined changing coordinate and formed of a plurality of neighboring color pixels; and
a unit for performing a changing by using the determined changing coordinate without changing a shape of the detected closed region.

2. The image forming apparatus according to claim 1, further comprising:
a unit for calculating an allowable range of the changing coordinate in the main scanning direction based on the shift amount and a resolution of bitmap data of the image to be formed; and
a unit for judging whether or not the allowable range of the changing coordinate includes a region outside the drawing object, wherein
the unit for determining the changing coordinate determines a coordinate outside the drawing object as the changing coordinate.

3. The image forming apparatus according to claim 1, wherein the drawing object is obtained from intermediate data.

4. An image forming method comprising the steps of:
determining a changing coordinate in a main scanning direction for correcting a color shift in a sub scanning direction on the basis of a shift amount of the color shift, the color shift expected to occur in image formation of a generated image;
detecting a closed region from a drawing object based on which the image is formed, the closed region lying across the determined changing coordinate and formed of a plurality of neighboring color pixels; and
performing a changing by using the determined changing coordinate without changing a shape of the detected closed region.

5. The image forming method according to claim 4, further comprising the steps of:
calculating an allowable range of the changing coordinate in the main scanning direction based on the shift amount and a resolution of bitmap data of the image to be formed; and
judging whether or not the allowable range of the changing coordinate includes a region outside the drawing object, wherein
the determining the changing coordinate determines a coordinate outside the drawing object as the changing coordinate.

6. The image forming method according to claim 4, wherein the drawing object is obtained from intermediate data.

* * * * *